United States Patent [19]

Edge

[11] Patent Number: 5,294,147
[45] Date of Patent: Mar. 15, 1994

[54] CRASH PROTECTION DEVICE

[75] Inventor: Stanley J. Edge, Birmingham, England

[73] Assignee: Uta Clifford Limited, England

[21] Appl. No.: 909,025

[22] Filed: Jul. 6, 1992

[30] Foreign Application Priority Data

Jul. 13, 1991 [GB] United Kingdom ............ 9115187

[51] Int. Cl.$^5$ .............................................. B60R 21/16
[52] U.S. Cl. ................................. 280/728 B; 280/731
[58] Field of Search ........... 280/728, 730, 731, 732, 280/728 B, 728 A, 730 R, 730 A

[56] References Cited

U.S. PATENT DOCUMENTS

| 3,887,214 | 6/1975 | Brawn | 280/730 |
| 3,888,508 | 6/1975 | Kizu et al. | 280/731 |
| 4,934,735 | 6/1990 | Embach | 280/731 |
| 5,002,306 | 3/1991 | Hiramitsu et al. | 280/731 |
| 5,002,307 | 3/1991 | Heidorn | 280/728 B |
| 5,217,254 | 6/1993 | Satoh | 280/732 |

FOREIGN PATENT DOCUMENTS

| 486708 | 5/1992 | European Pat. Off. |
| 4027068 | 10/1989 | Fed. Rep. of Germany |
| 2228235 | 8/1990 | United Kingdom |
| 2236082 | 3/1991 | United Kingdom |
| 2241665 | 9/1991 | United Kingdom |
| 9118769 | 12/1991 | World Int. Prop. O. |

Primary Examiner—Margaret A. Focarino
Assistant Examiner—Paul Dickson
Attorney, Agent, or Firm—Andrus, Sceales, Starke & Sawall

[57] ABSTRACT

A crash protection device for use in a vehicle has a housing including an opening. An inflatable bag and inflator means are contained within the housing and arranged such that, on activation of the device, the bag inflates and protrudes through the opening. The housing has at least one flap pivotally attached to the remainder of the housing, and flap retainment means for retaining the at least one flap in a position overlying the opening such that (a) before activation of the device, the at least one flap is held in a position in which it retains the bag within the housing and (b) upon activation of the device, the flap retainment means releases said at least one flap to permit protrusion of the bag through the opening. The device has a front cover overlying said housing and mounted on the or one of the flaps.

8 Claims, 2 Drawing Sheets

CRASH PROTECTION DEVICE

BACKGROUND OF THE INVENTION

This invention relates to crash protection devices for use in vehicles, and particularly to crash protection devices of the type in which a bag is inflated automatically under severe crash conditions to act as a cushion to restrict and cushion forward motion of an occupant of a vehicle with respect to the vehicle.

It is known to incorporate inflatable bag crash protection devices into vehicle steering wheels and also into the fascia panel of the vehicle in front of the front seat passenger. In known devices, the bag is contained within a housing forming part of the steering wheel of a vehicle. The housing includes a front cover whose exterior surface is designed to blend in with the rest of the interior of the vehicle On impact, the bag is inflated and forces its way out of the housing by tearing the front cover along one or more predetermined tear lines formed in the cover. These tear lines are defined by grooves or weakened zones moulded into the internal surface of the front cover to reduce the thickness thereof.

In order for the front cover to blend in with the interior of the vehicle, it is desirable to construct the front cover out of a material which complements the rest of the vehicle interior. It is not easy to form tear lines in some materials and so the range of materials available for use is restricted.

Commonly, the provision of grooves in the interior surface of the front cover can be discerned externally as apparent blemishes. It is therefore necessary to include features on the outer surface of the front cover to disguise such apparent blemishes. In order to make the front cover blend in with the rest of the interior of the vehicle, these features may not be desirable. The tear lines are also weak points on the front cover and so render the front cover more prone to accidental damage.

GB-A-2228235 (and corresponding DE-A-3942694) and GB-A-2241665 disclose crash protection devices of the type where the inflatable bag is contained within a housing having a front cover. Such front cover has a relatively hard core and a relatively soft external surface layer in situ moulded over the core, and the weakened zones are formed in the relatively hard core. Whilst such an arrangement does permit a certain degree of flexibility of design to enable the front cover to blend in with the interior of the vehicle, the external surface layer is required to have properties which do not interfere with correct breaking of the core upon inflation of the bag. Thus, for example, the use of fabric or leather to match the interior of the vehicle will normally be precluded in devices of this type.

In vehicles including crash protection devices as described above, it is difficult to include switches for controlling other devices included in the vehicle, for example, the horn, on the steering wheel because the whole device needs to be able to move when the switch is activated. It is also difficult to fix decorated emblems or other embellishments on the front cover as they may become disconnected from the front cover on inflation of the bag, and be a hazard to the vehicle occupants.

SUMMARY OF THE INVENTION

According to the present invention, there is provided a crash protection device for use in a vehicle, the device comprising a housing including an opening, an inflatable bag and inflator means contained within the housing and arranged such that, on activation of the device, the bag inflates and protrudes through the opening, said housing further including a flap pivotally attached to the remainder of the housing, flap retainment means for retaining said flap in a position overlying the opening such that (a) before activation of the device, the said flap is held in a position in which it retains the bag within the housing and (b) upon activation of the device, said flap retainment means releases said flap to permit protrusion of the bag through the opening, and a front cover overlying said housing and being mounted for movement with said flap.

Such an arrangement gives a wide flexibility of design for the front cover without the risk of interfering with proper operation of the device.

Preferably, the front cover is mounted on the or one of the flaps.

Preferably, said flap is pivotally attached to the housing by a hinge arrangement.

Preferably, said hinge arrangement comprises at least one clip attached to the housing, a portion of each clip protruding through a respective aperture formed in said flap.

Preferably, the flap retainment means comprises relatively weak portions interconnecting said flap and the remainder of the housing such that on inflation of the bag, the weak portions tear allowing said flap to pivot.

Preferably, the weak portions comprise lines along which perforations are formed in the housing, and along which tearing occurs upon bag inflation.

Alternatively, the weak portions comprise grooves, preferably perforated grooves, formed in the housing reducing the thickness thereof and along which tearing occurs upon bag inflation.

Preferably, flap is rectangular in shape, and is defined on three sides by the grooves, and on the fourth side by the hinge arrangement.

Preferably, the front cover is provided with at least one switch device for activating and deactivating other devices in the vehicle to which the protection device is arranged to be fitted.

Preferably, each switch device is a laminate switch.

Preferably, a layer of fabric or leather is provided on the front cover, the layer blending in with the design of the vehicle interior.

Preferably, the layer is bonded to the front cover.

Preferably, the crash protection device is arranged to be fitted to the steering wheel of the vehicle.

Alternatively, the crash protection device is arranged to be fitted in a position in front of a passenger seat of the vehicle.

In embodiments where more than one flap is provided, the front cover will normally be fastened to only one of the flaps.

BRIEF DESCRIPTION OF THE DRAWINGS

The invention will further be described by way of example with reference to the accompanying drawings, in which.

DETAILED DESCRIPTION OF THE PREFERRED EMBODIMENT

Figure 1:
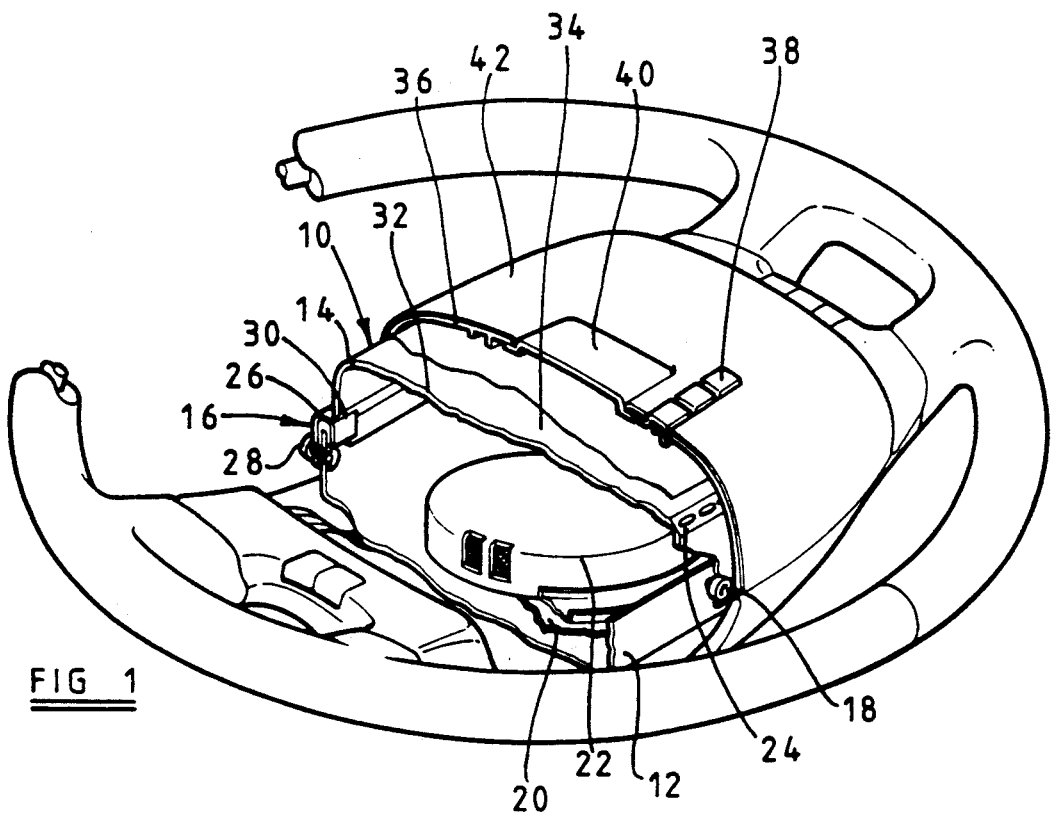
FIG. 1 is a perspective view, part broken away, of a crash protection device of one embodiment of the present invention.

The crash protection device shown in FIG. 1 forms the boss of a vehicle steering wheel. It is to be understood that, *mutatis mutandis*, a similar device could be fitted into the fascia or front door of the vehicle to protect a front seat passenger, or fitted in the rear of the front seats or in the rear doors of a vehicle to protect passengers in the rear seats of the vehicle.

The crash protection device comprises a two part housing 10 including a base 12 and an upper portion 14. The base 12 is formed of steel sheet and takes the form of a rectangular tray. The upper portion 14 is an injection moulded thermoplastics material. The upper portion 14 is attached to the base 12 by a hinge arrangement 16 along one edge, and by screws 18 on the other three sides.

An inflatable bag 20 and inflator means 22 are contained within the housing 10. The inflator means 22 is anchored to the base 12 of the housing 10. The inflator means 22 is a pyrotechnic gas generator device of a type known per se which, when activated, produces enough gas to inflate the bag 20. If a crash occurs, the bag 20 needs to be inflated within a time of between 25 and 40 milliseconds from impact in order to provide a satisfactory cushion for the occupant.

The upper portion 14 of the housing 10 is moulded to include combined fold and tear lines 24. These lines 24 are defined by perforated grooves formed in the outer surface of the upper portion 14,-the perforated grooves weakening the housing 10, and hence acting as guides along which the upper portion 14 can be folded, and which will tear on inflation of the bag 20.

The fold and tear lines 24 form three sides of a rectangle, the hinge arrangement 16 forming the fourth side of the rectangle. The hinge arrangement 16 further comprises a plurality of steel clips 26 attached to the base 12 by means of bolts 28. A portion of each steel clip 26 passes through a corresponding aperture 30 provided in the upper portion 14 of the housing 10. The area defined by the fold and tear lines 24 and hinge arrangement 16 forms a flap 32 covering an opening 34 in the upper portion 14 through which the bag 20 protrudes when inflated.

A cover 36 is mounted upon the flap 32. The cover 36 is designed to blend in with the design of the rest of the interior of the vehicle. Incorporated into the cover 36 are switches 38 for activation of other devices fitted in the vehicle, for example, the horn. The switches 38 include a strip of electrically conductive material, for example carbon. When the switch 38 is pressed, the conductive material provides a conductive link between two terminals of an electric circuit. The switch may also include a biasing element which biases the switch 38 to a position in which the strip of conductive material does not link the terminals of the circuit. Also, the cover 36 is fitted with a button 40 incorporating a decorative emblem.

Cover 36 is preferably made from a plastics material. If required, a layer 42 of leather or fabric to match the interior of the vehicle may be attached to the outer surface of the cover 36. This layer 42 is included to improve the attractiveness of the device and allow it to blend in with the rest of the vehicle.

Figure 3:
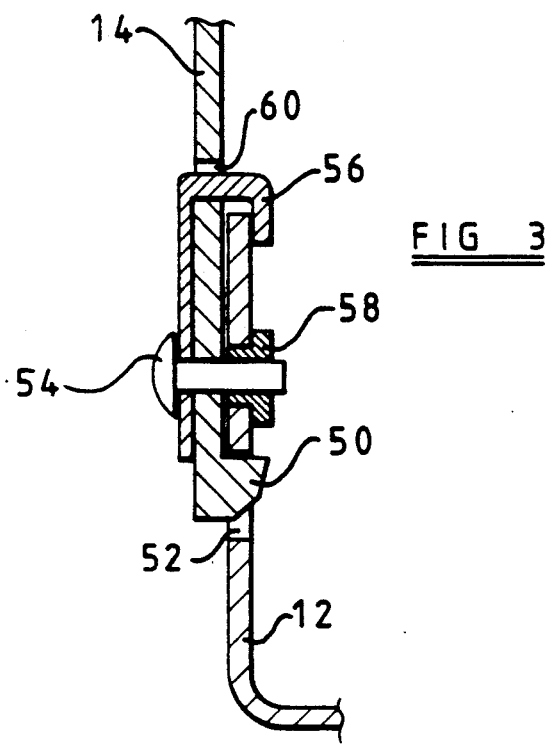
FIG. 3 is a cross sectional view through part of an alternative embodiment of a crash protection device.

An alternative means for attaching the upper portion 14 to the base 12 is shown in FIG. 3. In this alternative, the upper portion 14 is shaped to include a plurality of lugs 50 spaced around three sides of the lower edge of the upper portion 14. Each lug 50 protrudes through a respective aperture 52 formed in the base 12. A bolt 54 extends through a clip 56, and apertures formed in the upper portion 14 and base 12. A nut 58 which is prevented from rotating with respect to the base 12 engages with the bolt 54. The clip 56 extends through an aperture 60 formed in the upper portion 14 and engages with the base 12. The fourth side of the upper portion 14 is attached to the base by the hinge arrangement 16.

Figure 2:
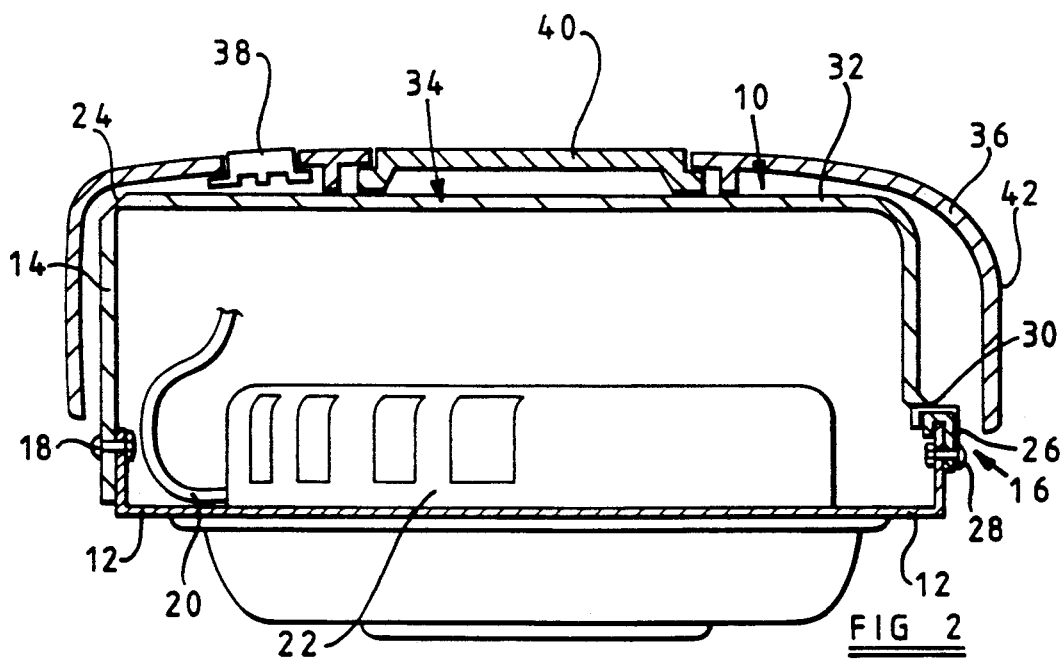
FIG. 2 is a cross sectional view through the crash protection device of FIG. 1.

The cover 36 may be attached to the flap 32 by bolts, screws, clips, adhesive or any other means. In FIGS. 1 and 2, the cover 36 is attached to the flap 32 by adhesive means. The decorative button 40 is attached to the cover 36 by lips extending from the button 40 behind the cover 36.

Figure 4:
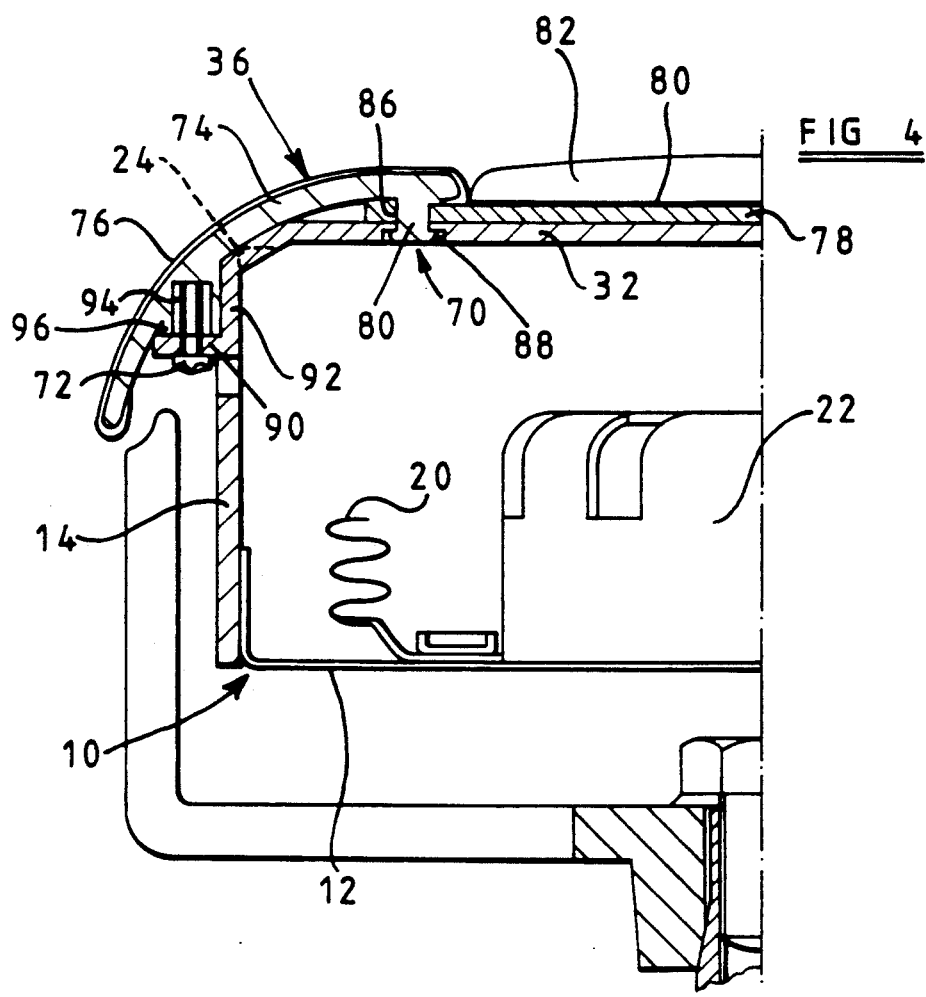
FIG. 4 is a cross-sectional view through part of a further modification.

In FIG. 4, the cover 36 is mechanically attached to the flap 32 by means of snap fasteners 70 and screws 72 (only one of each are illustrated in FIG. 4). The cover 36 includes (a) a main surrounding portion 74 trimmed with an applied trim material 76 such as bonded fabric, pvc or leather to match the automobile interior, and (b) a central support moulding 78 to which a decal 80 having a suitably soft transparent lens 82 moulded thereon is adhesively secured. Each fastener 72 comprises a headed stud 84 which passes through a respective aperture 86 in the support moulding 78 and is snap-engaged in a respective stepped aperture 88 in the flap 32. Each screw 72 passes through an aperture 90 in a respective shaped lug 92 formed integrally with the flap 32. Each screw 72 engages in a respective threaded metal insert 94 fixed in a sleeve 96 integrally moulded with the surrounding portion 74. The shaped lugs 92 are spaced apart around those sides of the flap 32 have the fold and tear lines 24 thereon, such lines 24 (only one shown in FIG. 4) being provided as short lengths which extend between the shaped lugs 92.

The cover 36 prevents the housing 10 and the flap 32 from being readily visible to the occupants of the vehicle. The housing 10 is therefore not limited to the usual size of the steering wheel boss, and can be any size provided a cover 36 of suitable size can be attached to cover the housing 10. Since the size of the housing 10 is not limited, the housing 10 can be designed to include a larger than usual opening 34 through which the bag 20 protrudes when inflated, allowing the bag 20 to be inflated in a shorter period of time. As stated earlier, the bag 20 needs to be inflated within a short period of time to be of use as a cushion to an occupant of a vehicle in the event of a crash.

Also, as the housing 10 is hidden from view by the cover 36, the fold and tear lines 24 can be formed in the optimum locations for consistent tearing. Ideally, the fold and tear lines 24 are straight lines as these tend to tear consistently. Since the fold and tear lines 24 are hidden from view, the layout of the fold and tear lines is not restricted to those which are pleasing to the eye. The dimensions of the flap 32 are not limited by the dimensions required for the design of the cover 36 to blend in with the rest of the interior of the vehicle.

On impact, the inflator means 22 causes the bag 20 to be inflated. After a short period of time, the bag 20 will no longer fit inside the housing 10 and forces the housing 10 to tear along the lines 24. On opening along the tear lines 24, the flap 32 and the cover 36 are able to pivot about the hinge arrangement 16 and are moved to a position in which they do not unduly inhibit the expansion of the bag 20. The bag 20 is then able to expand through the opening 34 of the housing 10 to a position in which it can act as a cushion to the driver of the vehicle, thus reducing the risk of serious injury to the driver of the vehicle.

The bag 20 includes, in a known manner, a number of apertures so that when the occupant and the bag 20 collide, the bag 20 partially deflates, and hence is softer for the occupant to collide with. The risk of serious injury to the vehicle occupant is thus further reduced.

I claim:

1. A crash protection device for use in a vehicle, said device comprising a housing including an opening, an inflatable bag, and inflator means contained within the housing and arranged such that, on activation of the device, said inflatable bag inflates and protrudes through the opening, said housing further including a pivot means pivotally attaching a flap to the remainder of the housing, flap retainment means for retaining said flap in a position overlying said opening such that (a) before activation of the device, said flap is held in a position in which it retains said bag within said housing and (b) upon activation of the device, said flap retainment means releases said flap to permit said flap to pivot about said pivot means so as to allow protrusion of said bag through the opening, a front cover overlying said housing, and fastening means securing said front cover solely to said flap so that said front cover moves with said flap when said flap is released by said flap retainment means.

2. The device according to claim 1, wherein said pivot means is a respective hinge arrangement.

3. A device according to claim 2, wherein said hinge arrangement comprises at least one clip attached to the housing, said clip having a portion protruding through an aperture formed in said flap.

4. A device according to claim 1, wherein said fastening means is a mechanical fastening means.

5. A device according to claim 1, wherein said front cover is provided with at least one switch device for activating and deactivating other devices in the vehicle to which the protection device is arranged to be fitted.

6. A device according to claim 5, wherein said switch device is a laminate switch.

7. A device according to claim 1, wherein a layer of decorative material is provided on said front cover.

8. A device according to claim 7, wherein said layer is bonded to said front cover.

* * * * *